United States Patent [19]
Kottowski et al.

[11] 3,730,266
[45] May 1, 1973

[54] PROCESS AND APPARATUS FOR THE UNIFORM DISTRIBUTION OF COOLANT TO HEATING SURFACES IN A METAL-COOLED REACTOR OR EVAPORATOR

[75] Inventors: Heinz Kottowski, Ranco; Gunther Grass, Casciago, both of Italy

[73] Assignee: European Atomic Energy Community (Euratom)

[22] Filed: Oct. 27, 1969

[21] Appl. No.: 869,776

[30] Foreign Application Priority Data

Nov. 6, 1968   Germany...................P 18 07 986.2

[52] U.S. Cl. .............165/186, 122/28, 122/32, 122/39, 159/13 C, 176/51, 176/57, 176/81
[51] Int. Cl.......................................F22b 1/02
[58] Field of Search.................165/109, 115, 154, 165/156, 174, 177; 176/51, 54, 81, 57, 61, 64; 122/31, 39, 32, 28; 261/79 A, 153, 118; 159/6, 6 W, 13 C; 202/236; 203/89, 90

[56] References Cited

UNITED STATES PATENTS

| | | |
|---|---|---|
| 3,414,753 | 12/1968 | Hruda...........................165/105 |
| 3,472,304 | 2/1967 | Evkin.............................159/6 |
| 3,366,157 | 1/1968 | Germerdonk et al..............159/6 W |
| 3,346,459 | 10/1967 | Prince et al. .....................176/36 |
| 3,368,946 | 2/1968 | Jenssen..........................176/61 X |
| 3,070,537 | 12/1962 | Treshow.......................165/174 X |

FOREIGN PATENTS OR APPLICATIONS

| | | |
|---|---|---|
| 250,792 | 4/1926 | Great Britain.................165/174 |
| 618,123 | 2/1961 | Italy.............................165/177 |
| 1,386,263 | 12/1964 | France..........................165/174 |
| 969,963 | 9/1964 | Great Britain..................176/54 |
| 1,232,350 | 4/1960 | France..........................176/64 |

Primary Examiner—Albert W. Davis, Jr.
Attorney—Stevens, Davis, Miller & Mosher

[57] ABSTRACT

A heat exchange apparatus for a nuclear reactor utilizing a liquid metal coolant. The metal moves through ducts having perforations or a porous area through which it can penetrate. Means are provided for producing a flow of the vapor of the liquid metal to distribute it evenly over the surface to be cooled after the vapor has emerged from the perforations or porous area.

6 Claims, 11 Drawing Figures

Patented May 1, 1973

PROCESS AND APPARATUS FOR THE UNIFORM DISTRIBUTION OF COOLANT TO HEATING SURFACES IN A METAL-COOLED REACTOR OR EVAPORATOR

The invention relates to a process and apparatus for the performance of a stable metal evaporation at relatively low pressure for cooling purposes.

Nowadays electric power is generated in coal-fired or nuclear power stations by the use of steam as the working medium and modern power stations use steam pressures of up to 100 bars. For the boiling process in the evaporator tubes or reactor ducts this relatively high pressure means that the transition from the liquid to the vapor phase proceeds continuously over a fairly great length or area of the boiling zone and (in individual ducts) without considerable instabilities.

However, if the working medium used is sodium, due to the high boiling temperatures (as much as 960°C at 2.0 bars) it has hitherto proved impossible for reasons to do with material techniques to operate reactors or evaporators at elevated operational pressures. Progress in the development of highly refractory materials indicates that within the next few years materials will be available which will be stable up to 1,500°C, but will not be very heat-resistant. In other words, such materials would enable high temperature metal-vapor power stations to be built for low operational pressures.

Due to the physical properties of sodium (more particularly due to the considerable difference in density between the vapor and the liquid), the construction of vapor generators of the kind specified at low pressures raises the following problems:

At low pressures liquids, more particularly liquid metals, tend readily to overheating and unstable boiling. Local boiling instabilities on a fairly large scale are the causes of heavy mechanical stressing of the constructional material. Moreover, in fairly large sodium-cooled reactors, reactivity rises with a decreasing density of the coolant. With coolant evaporation, therefore, the reactivity and power increase, and this is all the more dangerous, since cooling is simultaneously reduced. In general, therefore, but more particularly in a sodium boiler reactor, the unstable boiling behavior of sodium must be prevented. Apart from the technical solution to the problem of providing a stable-boiling sodium boiler reactor or evaporator, its economics are of course important. A yardstick for evaluating a thermal process is Carnot efficiency. If the Carnot efficiency of a modern steam power station is compared with the efficiency of a sodium boiler reactor, the following comparative data are found:

a. Steam power station

| | |
|---|---|
| $P = 100$ bars | Operational pressure |
| $t_s = 500°C$ | Steam temperature |
| $t = 40°C$ | Condenser temperature |
| $\eta C = 0.595$ | Carnot efficiency | b. Sodium boiler reactor of approximately identical Carnot efficiency

| | |
|---|---|
| $\eta C_{Na} = 0.582$ | Carnot efficiency |
| $P = 5.0$ bars | Operating pressure |
| $t_{Na} = 1100°C$ | Boiling temperature |
| $t_o = 300°C$ | Condenser temperature | or $\eta C_{Na} = 0.61; P = 9.0$ bars; $t_{Na} = 1,200°C: t_o = 300°C$

The total efficiency of a power station installation is of course the product: $\eta$ Installation $= \eta C \cdot \eta i \cdot \eta m \cdot \eta k \cdot \eta l$ where:

$\eta C$ = Carnot efficiency, $\eta i$ = internal efficiency of the turbine,
$\eta m$ = mechanical efficiency, $\eta k$ = fuel utilization factor
$\eta l$ = generator efficiency.

Apart from Carnot efficiency, all the other efficiencies depend on the system or construction. $\eta_C$ is therefore the yardstick for the working capacity of the heat stored in the steam. The above comparison shows how competitive a power station operated by a sodium boiler reactor is in comparison with a modern steam power station, if only as regards possible heat utilization. Sometimes the high temperatures enable a MHD process to be connected upstream of the turbine process. The relatively high condenser temperatures permit the further utilization of the waste heat in a steam turbine process, so that with these additional processes, the sodium vapor process is clearly superior to the conventional steam process.

No special methods are known for metal vapor production, but frequently use is made of a trickle film in evaporation coolers and material-exchange columns in the chemical industry. A number of publications have appeared concerning theoretical and experimetal work on trickle film evaporation with water and alkali metals. Methods are known for direct evaporation in water-cooled reactors.

It is an object of the invention to provide a process for the uniform distribution of the liquid metal in the form of a film on the fuel elements or on the evaporation tubes, such as is required for stable evaporation, in such a way that no dry places can be formed on the fuel elements or tubes, evaporation is performed continuously, and overheated places on the fuel elements or tubes which might lead to burn-out are prevented, as also are local changes in the density of the coolant which influence local reactivity and therefore reactor stability.

The invention provides a process for effecting a stable evaporation of a liquid metal for cooling purposes characterised in that the liquid metal is caused to emerge from perforations or pores and is then distributed over a surface to be cooled by flowing vapor of the metal.

More specifically according to the invention the liquid metal to be vaporized emerges in a precisely controllable manner from fine perforations or a porous surface and is then carried by metal vapor flowing past on to the surface provided for evaporation and is uniformly distributed there.

Conveniently the medium to be vaporized first passes in the reactor core through a preheat zone, then through an evaporation zone with a stabilized trickle film and into a vapor superheating zone.

According to other possible features of the invention, the vapor is then fed to a turbine and a condenser, whereafter the vapor is returned via a pump and a purification system to the preheater; a MHD generator is connected upstream of the turbine; and the condenser is used as an evaporator in a secondary circuit.

Advantageously in a nuclear reactor having a primary circuit operated by sodium at an operational pressure of 10-15 bars and a primary circuit cooler acting as an evaporator in the secondary circuit, the liquid metal to be evaporated emerges in the evaporator in a precisely controllable manner from fine perforations or a porous surface and is then carried by the metal vapor flowing past on to the surface provided for evaporation and is uniformly distributed there.

According to the invention, in a nuclear reactor having a primary circuit operated by a salt metal at an operational pressure of about 1 bar and a primary circuit cooler acting as an evaporator in the secondary circuit, the liquid metal to be evaporated emerges in the evaporator in a precisely controllable manner from a permeable surface having fine perforations or a porous nature and is then carried by the metal vapor flowing past on to the surface provided for evaporation.

According to another possible feature of the invention a propellent vapor generator producing the amount of propellant vapor required to stabilize the trickle film is included in the secondary circuit upstream of the main evaporator.

Independently of the last-mentioned feature, the evaporator can be followed by a turbine, a condenser and a pump, a MHD generator being possibly included between the evaporator and the turbine.

Conveniently, the liquid metal is first passed through ducts connected to the collecting chamber to the surface provided for evaporation and there passes in a precisely controllable manner via fine perforations or through a porous surface on to the surface provided for evaporation, the pressure drop in the porous wall being greater than in the liquid- carrying duct.

Advantageously, the ducts extend spiral-fashion around the heating element and have a pitch such that the space between the ducts is coated with a film of liquid even when the liquid in the ducts is at minimum pressure.

According to another possible feature of the invention the liquid metal is sprayed from ducts disposed on the periphery of a spraying tube and covered with a porous substance, for instance a sintered metal, into the vapor flow, the vapor having conferred on it by single-thread or multi-thread baffles a spiral movement which carries the sprayed particles on to the heating elements.

Equally well, however, according to another possible feature of the invention the liquid metal is sprayed from perforations disposed spiral-fashion on the surface of the spraying tube, the vapor having conferred on it by single-thread or multi-thread baffles a spiral movement which carries the sprayed particles on to the heating elements.

The spirals formed by the rows of perforations can all have a pitch in the same direction, or some of the spirals can have a pitch in the same direction and others in the contrary direction.

Conveniently in many cases the liquid metal emerges from perforations provided parallel with the axis of the heating element in a small tube which also acts as a spacer and encloses the heating element spiral-fashion.

A boiler reactor or evaporator in which liquid metal, for instance sodium, is evaporated with minimum boiling instability operated by the process according to the invention and with an apparatus according to the invention is extremely advantageous. This kind of evaporation on the heating elements inter alia prevents changes in density which might cause undesirable fluctuations of reactivity. The metal vapor from the reactor — saturated vapor or superheated vapor — can be fed to a working process (a following MHD generator, turbine, condenser) without disturbance — i.e., with relatively small variations in state.

An exemplary non-limitative embodiment of the invention will now be described in greater detail with reference to the drawings, wherein.

The use of the process and apparatuses according to the invention will now be described with references to cases in which vapor generation is performed directly in the reactor, and also to cases where vapour generation is performed in the secondary circuit of the working process, a reactor being present in the primary circuit.

a. Vapour general directly in the reactor

Figure 1:
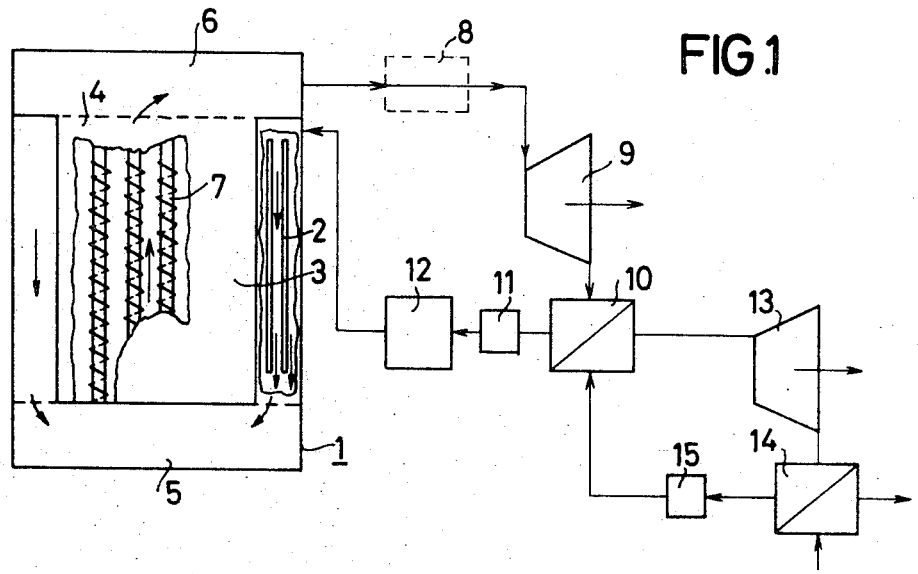
FIG. 1 is a circuit diagram for an alkali-metal vapor reactor with vapor generation directly in the reactor.
Figure 2:
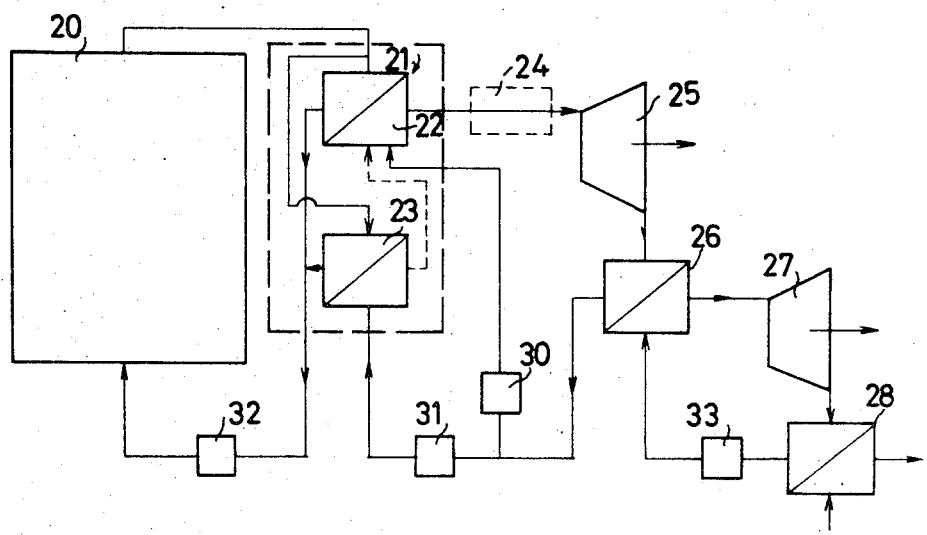
FIG. 2 is a circuit diagram for an alkali-metal vapour reactor with vapor generation in the secondary circuit of the working process.

FIG. 1 is a circuit diagram illustrating the route followed by the working medium with direct evaporation in a reactor 1. The reactor core is subdivided into three zones: a preheat zone 2 with downwardly flowing coolant, an evaporation zone 3, with a stabilized trickle film and a vapor superheating zone 4. Disposed below the core, between the outlet from the preheater and the inlet to the distributors of the evaporation zone, is a lower collecting chamber 5, a vapour-collect ing chamber 6 being disposed above the superheater.

The coolant is pumped from above through the outer preheat zone 2 of the core into the bottom collecting chamber 5 and thence to the operational devices of the evaporation zone — i.e., to liquid distributors 7 on the fuel elements, the coolant being distributed and evaporated in the form of an extremely even film on the fuel elements. The distributors 7 will be described in greater detail hereinafter.

After the vapor has passed through the superheater 4, it is collected in the vapor-collecting chamber 6 and can be fed from that place to the loads in the circuit process. The high boiling temperatures of sodium ($P = 5$ bars; $T_{Na} = 1,100°C$; $P = 9$ bars; $T_{Na} = 1,200°C$) means that an MHD generator can be connected upstream of the turbine with slight vapor superheating, so that the vapor coming from the vapor-collecting chamber is first fed via a MHD generator 8 and a turbine 9 to a condenser 10 and then, conveniently by means of a pump 11, to a purification system, and is finally returned to the preheat zone 2. Due to the relatively high temperature at which the heat given off in the condenser 10 is available ($T_o = 300°—400°C$), such heat can be fed to a conventional steam turbine process and therefore give off further energy. A following second circuit of this kind in general comprises the condenser 10 as a boiler, a steam turbine set 13, a condenser 14 and a pump 15.

b. Vapor generation in the secondary circuit of the working process with a reactor in the primary circuit The working medium of the primary circuit of a reactor 20 is either sodium, at operational pressures of 10–15 bars, or a salt melt at an operational pressure of 1 bar. The cooler 21 of the primary circuit takes the form of an evaporator 22 for the secondary circuit. With large evaporator units a propellant vapor generator 23, in which about $1/1,500 - 1/1,000$ of the total quantity is evaporated, is connected upstream of the main evaporator 22. With small loads, the propellant vapor generator 23 can also be used to stabilize the trickle film and to prevent the flooding of the lower part of the evaporator during starting up. The liquid distributors are constructed in a similar way to those in the reactor with direct evaporation. The liquid distributors will be described in detail hereinafter. The secondary circuit can contain a MHD generator 24, a turbine 25, a condenser 26, and if necessary pumps 30, 31. A pump 32 can also be provided for the primary circuit. The condenser 26 of the secondary circuit can act as the evaporator in a tertiary circuit which contains a steam turbine set 27, a further condenser 28 and a pump 33.

Figure 3:
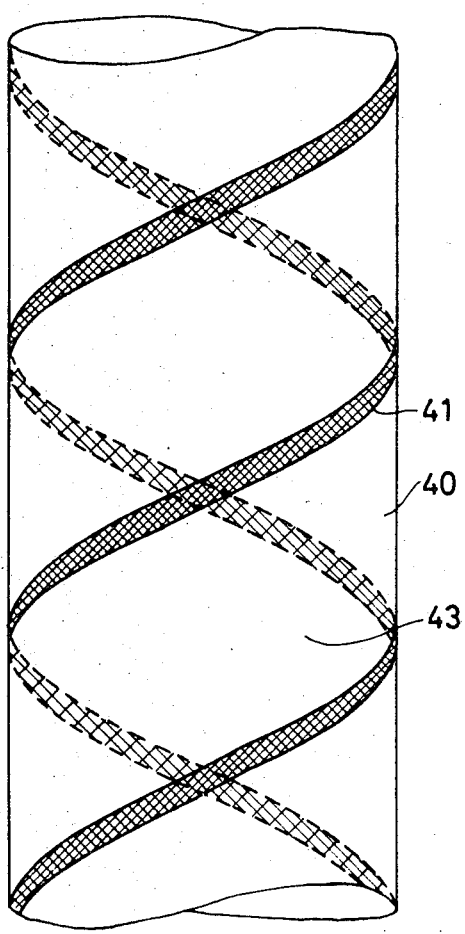
FIG. 3 shows a film distributing device on a heating element.

A more detailed description will now be given of the liquid distributors for producing a self-stabilizing trickle film. FIG. 3 shows a film distributing device on a heating element 40. Worked into the heating element 40 are one or more spiral-shaped ducts 41 which are connected at the bottom to the collecting chamber 5 and are closed off from the vapor chamber by a porous wall (e.g., of sintered metals) 42.

Figure 4:
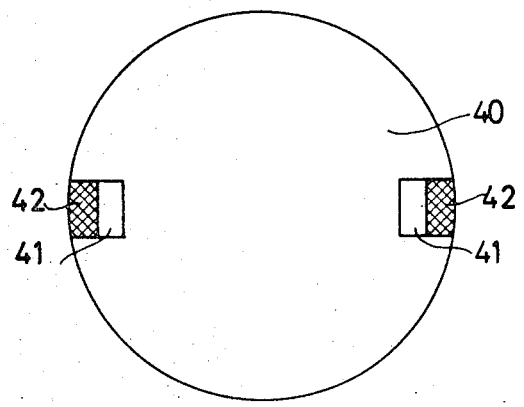
FIG. 4 is a cross-section through the heating element shown in FIG. 3.

The pressure drop in the porous wall must be greater than that in the liquid-carrying duct 41, to keep the duct 41 filled. The thickness of the film produced is controlled by variations in pump output. The pitch of the ducts 41 must be so selected in relation to the quantity of liquid emerging that the liquid is sufficient to wet the intermediate space 43, even when the liquid in the ducts 41 is at minimum pressure. The film of liquid disposed between the ducts is smoothed and distributed by the upwardly flowing vapor. FIG. 4 is a cross-section through a duct 41 covered, for instance, by sintered metal 42.

Figure 5:
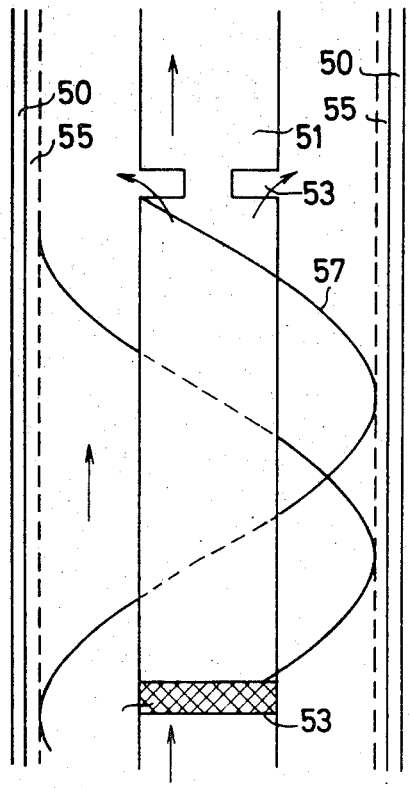
FIG. 5 shows a liquid distributor in the form of a spraying tube disposed between the fuel elements, baffles being provided for the required guidance of the vapor.
Figure 6:
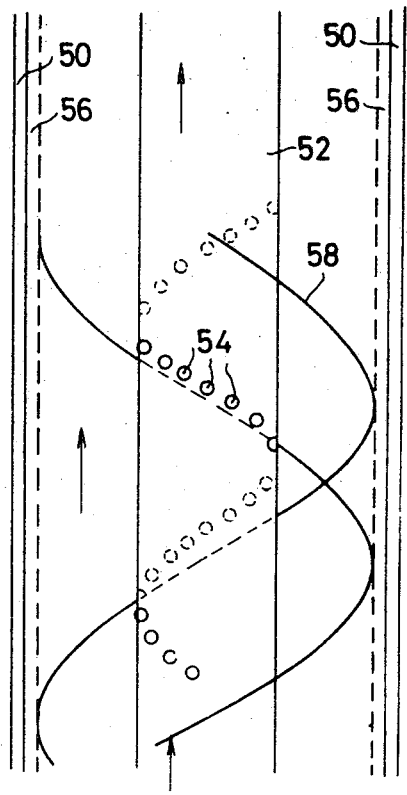
FIG. 6 shows a liquid distributor with rows of perforations distributed spiral-fashion.

FIGS. 5 and 6 show liquid distributors disposed between fuel elements 50 and taking the form of spraying tubes 51, 52 having single-thread or multi-thread spiral baffles 57, 58. The spraying tubes 51, 52 are formed with either transverse slots 53 (FIG. 5) or small perforations 54 (FIG. 6) arranged on a helix having the same or opposite hand to that of the spiral baffles 58 (FIG. 6). The rising vapor is given a whirl by the baffle spirals and distributes the liquid emerging from the slots 53 or perforations 54 by centrifugal effect to the heating elements 50. The component of the whirl in the direction of flow parallel with the heating elements 50 distributes, smooths and stabilizes the film 55, 56 in the axial direction.

Figure 7:
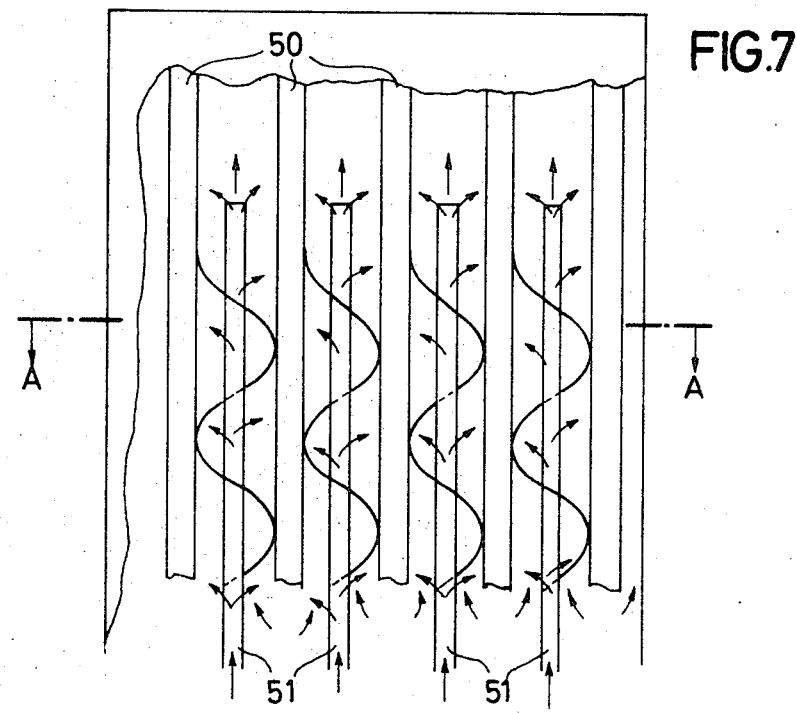
FIG. 7 shows an arrangement of liquid distributors in the reactor or evaporator.
Figure 8:
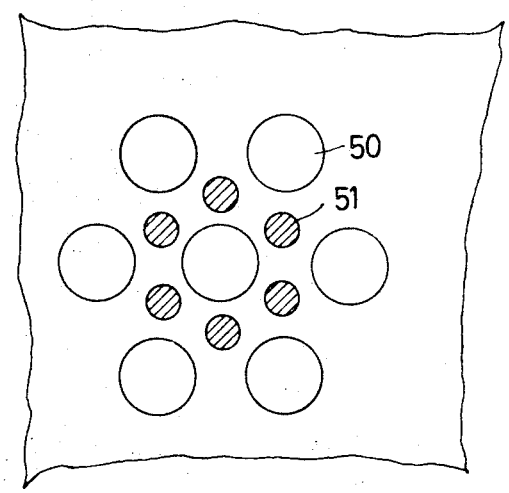
FIG. 8 shows an arrangement corresponding to FIG. 7, sectioned along the line A—A.

FIGS. 7 and 8 show the arrangement of the liquid distributors 51, 52 in the reactor or evaporator. The liquid distributors 51, 52 are incorporated in the free space between the heating elements 50 or the evaporator tubes.

Figure 9:
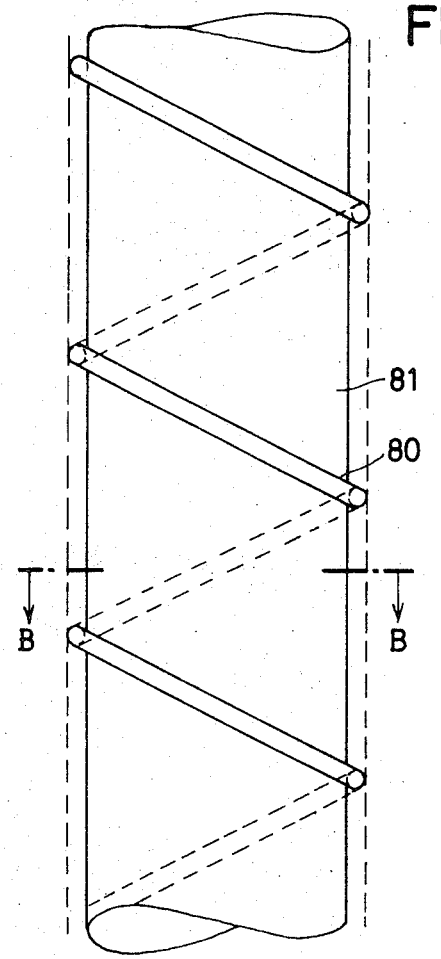
FIG. 9 shows a film distributor which also acts as a spacer for the heating rods and is disposed spiral-fashion around the heating element.
Figure 10:
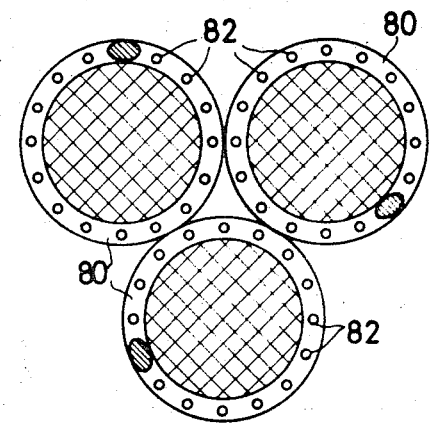
FIG. 10 shows an arrangement of three heating elements each having a small tube for film distribution which also acts as a spacer.
Figure 11:
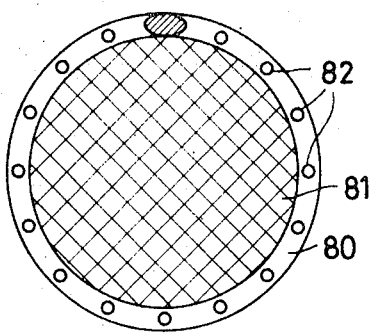
FIG. 11 is a cross-section through an individual fuel element having a small tube for film distribution which also acts as a spacer.

FIGS. 9 to 11 show a film or liquid distributor 80 also acting as a spacer for the heating rods 81. The spacer and liquid distributor 80 is a thin small tube formed with fine perforations with their mouths facing in the direction parallel with the heating element or rod 81, the small tube extending spiral-fashion around the heating element 81. The rising vapor distributes the liquid uniformly over the surfaces of the rod or element 81.

The film evaporation allows stable evaporation at low pressures. The liquid distributors constructed according to the invention continuously wet the heating elements or evaporator tubes with an adequate supply of liquid. The course of temperature in the film and therefore in the fuel element is mainly determined by the temperature of the vapor mist or the vapor in the cooling duct. All the instances discussed have a mist or vapor flow with a liquid film on the surfaces.

This kind of cooling has three important advantages:

a. The film evaporation smooths out temperature differences due to the density of heat flux over the length of the fuel elements not being constant, since the mist temperature remains substantially constant between the inlet and outlet of the evaporation zone. There is more evaporation and therefore improved cooling at the places of higher heat flux density. The film evaporation buffers the temperature peaks.

b. The film evaporation prevents local changes in density which may have an adverse effect on reactor safety due to the positive reactivity coefficient. On the contrary, extra safety is achieved, since with raised pump output the film thickness increases for the same nuclear output. The film offers a further advantage, for instance, if the pump fails. The rise in reactivity of the reactor is delayed by the evaporation time of the film.

c. A superheater can be directly connected to the part of the evaporator in the core, so that the evaporator and superheater can be accommodated in a duct in the core, with satisfactory stability properties of the reactor.

We claim:

1. Apparatus for performing a stable metal evaporation on a heated surface in a nuclear reactor for cooling purposes comprising ducts for a liquid metal with walls having a permeable area, said permeable area being at least one helix extending over the length of the surface, means for effecting flow of liquid metal through the ducts and out of the ducts through said permeable area, the pitch of said helix being such that the space between the ducts is coated with an even film of liquid metal over the surface to be cooled and means for producing a flow of vapor of the metal to distribute the liquid metal emerging from the permeable area evenly over the surface to be cooled.

2. The apparatus of claim 1 in which the permeable area is a plurality of perforations on the surface of a spraying tube.

3. The apparatus of claim 1 in which the helices all have a pitch in the same direction.

4. The apparatus of claim 1 in which some of the helices have a pitch in one direction and others in the opposite direction.

5. The apparatus of claim 1 in which the permeable area is of a sintered metal.

6. An apparatus as claimed in claim 1 in which the liquid metal emerges from perforations provided, parallel with the axis of the heating element in a small tube which also acts as a spacer and encloses the heating element helix-fashion.

* * * * *